(12) United States Patent
Hoskin

(10) Patent No.: US 9,021,779 B2
(45) Date of Patent: May 5, 2015

(54) SYSTEMS AND METHODS FOR COMBUSTOR EMISSIONS CONTROL

(75) Inventor: Robert Frank Hoskin, Duluth, GA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/160,539

(22) Filed: Jun. 15, 2011

(65) Prior Publication Data

US 2012/0317989 A1 Dec. 20, 2012

(51) Int. Cl.
| | |
|---|---|
| F02C 7/057 | (2006.01) |
| F02C 9/00 | (2006.01) |
| F02G 3/00 | (2006.01) |
| F23R 3/26 | (2006.01) |
| F23J 15/02 | (2006.01) |
| F23J 15/00 | (2006.01) |
| F02C 9/54 | (2006.01) |

(52) U.S. Cl.
CPC .............. *F23J 15/02* (2013.01); *F23J 15/003* (2013.01); *F23J 2215/101* (2013.01); *F23J 2219/10* (2013.01); *F02C 9/54* (2013.01); *F05D 2270/0831* (2013.01); *F05D 2270/082* (2013.01)

(58) Field of Classification Search
USPC .............. 60/39.5, 772, 773, 299, 301, 39.23, 60/39.24, 39.27, 794
See application file for complete search history.

(56) References Cited

U.S. PATENT DOCUMENTS

| | | | |
|---|---|---|---|
| 5,855,111 A * | 1/1999 | Oguchi et al. ................. 60/39.5 |
| 6,721,649 B2 * | 4/2004 | Knott et al. ................... 701/114 |
| 6,912,856 B2 | 7/2005 | Morgan et al. | |
| 6,978,620 B2 | 12/2005 | Cooper et al. | |
| 7,100,357 B2 | 9/2006 | Morgan et al. | |
| 7,593,803 B2 * | 9/2009 | Healy et al. .................... 701/100 |
| 7,721,535 B2 * | 5/2010 | Ruth et al. ...................... 60/295 |
| 7,824,636 B1 * | 11/2010 | Kraemer et al. ........... 423/239.1 |
| 2009/0188235 A1 * | 7/2009 | Robel et al. ..................... 60/276 |
| 2010/0024379 A1 | 2/2010 | Sengar et al. | |
| 2010/0215558 A1 * | 8/2010 | Kraemer ................... 423/239.1 |

FOREIGN PATENT DOCUMENTS

| | | |
|---|---|---|
| JP | H09103648 A | 4/1997 |
| WO | 2009016665 A1 | 2/2009 |
| WO | 2009017597 A1 | 2/2009 |
| WO | 2009070734 A1 | 6/2009 |

OTHER PUBLICATIONS

U.S. Appl. No. 12/702,557, filed Feb. 9, 2010, Hoskin.
GE Energy, Title: "OpFlex* Enhancements Ammonia Transient Control", Dated Jun. 2009, pp. 1-2.
Dan Deroeck, Title: "Guidance for Implementing 1-Hour NO2 NAAQS for PSD", Dated Jul. 15, 2010, New Source Review Group, pp. 1-9.
Morio Hori "An Experimental and Kinetic Calculation of the Promotion Effect of Hydrocarbons on the No—NO2 Conversion in a Flow Reactor", Twenty-Seventh Symposium (International) on Combustion/The Combustion Institute, 1998/pp. 389-396).
EP Search Report and Written Opinion dated Dec. 9, 2013, issued in connection with corresponding EP Patent Application No. 12171668.2.

* cited by examiner

*Primary Examiner* — Craig Kim
(74) *Attorney, Agent, or Firm* — Sutherland Asbill & Brennan LLP

(57) ABSTRACT

The present application thus provides a gas turbine engine system. The gas turbine engine system may include a gas turbine engine, a nitrogen oxides reduction system in communication with a flow of combustion gases downstream from the gas turbine engine, and a nitrogen oxides controller to control the ratio of nitrogen dioxide to nitrogen oxides in the flow of combustion gases entering the nitrogen oxides reduction system.

19 Claims, 4 Drawing Sheets

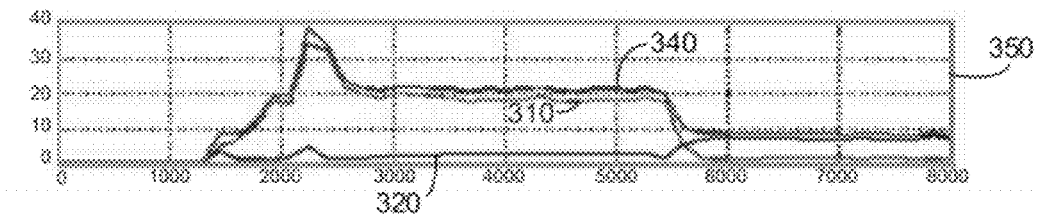
Fig. 3
Fig. 4
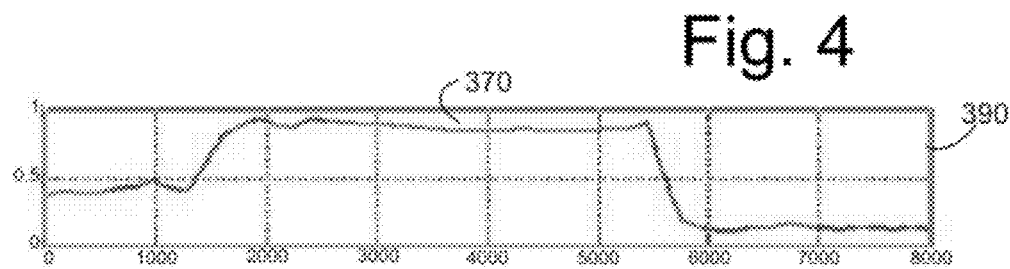
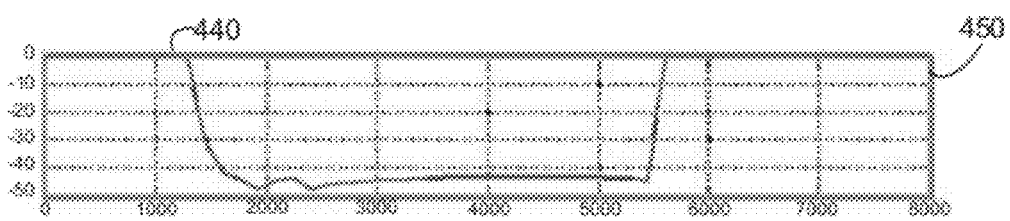
Fig. 5

SYSTEMS AND METHODS FOR COMBUSTOR EMISSIONS CONTROL

TECHNICAL FIELD

The present application and the resultant patent relate generally to gas turbine engines and more particularly relate to systems and methods for improved control of emissions of nitrogen oxides ($NO_x$) as well as reduced production of nitrogen dioxide ($NO_2$).

BACKGROUND OF THE INVENTION

In the operation of gas turbines, nitrogen oxides (NOx) are often produced in the exhaust gas, with NOx including nitrogen monoxide (NO) and nitrogen dioxide ($NO_2$). With regulations of NOx emissions becoming more stringent throughout the world, minimizing such emissions is an important design criterion. For example, the U.S. Environmental Protection Agency recently has implemented new regulations regarding hourly stack $NO_2$ emissions during all periods of operation including startup.

One solution for reducing overall NOx emissions is the use of a selective catalyst reduction ("SCR") system. Such a SCR system can be connected to the gas turbine exit via ducting. The SCR system adds a reductant, typically ammonia or urea, to the exhaust gas stream before passing the stream through a catalytic bed so as to absorb selectively the nitrogen oxides and the reducing agent. The absorbed components undergo a chemical reaction on the catalyst surface and the reaction products are desorbed. Specifically, the reductant reacts with the nitrogen oxides in the flow of the exhaust to form water and nitrogen. Catalysts that use other types of reductants are also known in the art.

The efficiency of the SCR system can depend in part on the temperature of the exhaust gas stream. The performance of the SCR system, however, also may be dependent in part on the level of $NO_2$ as a percentage of the total NOx. For example, the preferred ratio may be about one-to-one for $NO_2$-to-NO for catalysts used with ammonia or urea. Preferred ratios for other catalysts may range between zero-to-one and one-to-zero.

During some gas turbine operating conditions, the ratio of $NO_2$-to-NO at the gas turbine exit can be quite low, with NO being the predominant constituent of total NOx. During other operating conditions, the ratio of $NO_2$-to-NO can be quite high. The ratio of $NO_2$-to-NO also can change as exhaust gases flow at relatively lower velocities in the ducting from the gas turbine exit toward the SCR, reacting with other exhaust gas constituents along the way. In fact, the conversion of NO to $NO_2$ in combustion gases can be quite sensitive to temperature, the presence of carbon monoxide (CO), and the presence of unburned hydrocarbons (UHC's) due to uncombusted gas turbine fuels. The materials from which the ducting is constructed also can contribute to the conversion of NO to $NO_2$. Conversion of NO to $NO_2$ in gas turbine combustion streams can be undesirable because it can decrease NOx reduction efficiency in downstream NOx reduction equipment, including the SCR systems. Other components can also be present within the ducting that can influence the temperature of the combustion gases. These can include heat exchangers, duct burners and the like.

Conversion of NO to $NO_2$ downstream of the gas turbine also can be influenced by the presence of CO catalysts. CO catalysts may be utilized downstream of the gas turbine yet upstream of the NOx reduction equipment to convert CO to $CO_2$ so as to reduce CO emissions. Such CO catalysts also may promote conversion of NO to $NO_2$. For example, a commercially-available CO catalyst can oxidize about 95% of CO to $CO_2$ and also about 16% of NO to $NO_2$ at 700 degrees Fahrenheit (about 371 degrees Celsius). Combustion gas temperatures at the CO catalyst can be somewhat lower than at the gas turbine exit. Such CO catalysts can subject the NOx reduction equipment to undesired higher ratios of $NO_2$-to-NO.

There thus is a desire for improved methods and systems for the control of gas turbine engines in general and NOx reduction systems including SCR systems in specific so as to produce the minimum possible $NO_2$ and/or to produce a desired ratio of $NO_2$-to-NO so as to promote increased NOx reduction efficiency. Such improved methods and systems will promote reduced emissions without sacrificing overall gas turbine output and efficiency. Specifically, the improved methods and system described herein may be utilized to reduce NO-to-$NO_2$ conversion upstream of the CO catalyst so as to ensure an acceptable $NO_2$-to-NO ratio downstream of the CO catalyst and at the entry to the NOx reduction equipment.

SUMMARY OF THE INVENTION

The present application and the resultant patent thus provide a gas turbine engine system. The gas turbine engine system may include a gas turbine engine, a nitrogen oxides reduction system in communication with a flow of combustion gases downstream from the gas turbine engine, and a nitrogen oxides controller to control the ratio of nitrogen dioxide to nitrogen oxides in the flow of combustion gases entering the nitrogen oxides reduction system.

The present application and the resultant patent further provide a method of reducing emissions in a gas turbine engine system with a nitrogen oxides reduction system. The method may include the steps of determining an amount of nitrogen dioxide in a flow of combustion gases, determining an amount of nitrogen oxide in the flow of combustion gases, determining a ratio of nitrogen dioxide to nitrogen oxide in the flow of combustion gases, determining a desired ratio of nitrogen dioxide to nitrogen oxide in the flow of combustion gases, and changing a temperature of the flow of combustion gases entering the nitrogen oxides reduction system until the desired ratio is met.

The present application and the resultant patent further provide a nitrogen oxides emissions controller for use with a gas turbine engine and a selective catalyst reduction system. The nitrogen oxides emissions controller may include a nitrogen dioxide sensor positioned about the selective catalyst reduction system, a nitrogen oxide sensor positioned about the selective catalyst reduction system, a divider to produce a ratio signal representing a ratio of nitrogen dioxide to nitrogen oxide, an emissions look up table to produce a ratio indication signal, and a multiplier to produce an exhaust temperature offset signal.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

FIG. 3 is a plot of NO, NO$_2$, and NOx from a gas turbine engine as used with the NOx emissions controller of FIG. 2.

FIG. 4 is a plot of an intermediate parameter as may be produced by the NOx emissions controller of FIG. 2 in response to the NO and NO$_2$ levels of FIG. 3.

FIG. 5 is a plot of an exhaust temperature offset parameter as may be produced by the NOx emissions controller of FIG. 2.

DETAILED DESCRIPTION

Figure 1:
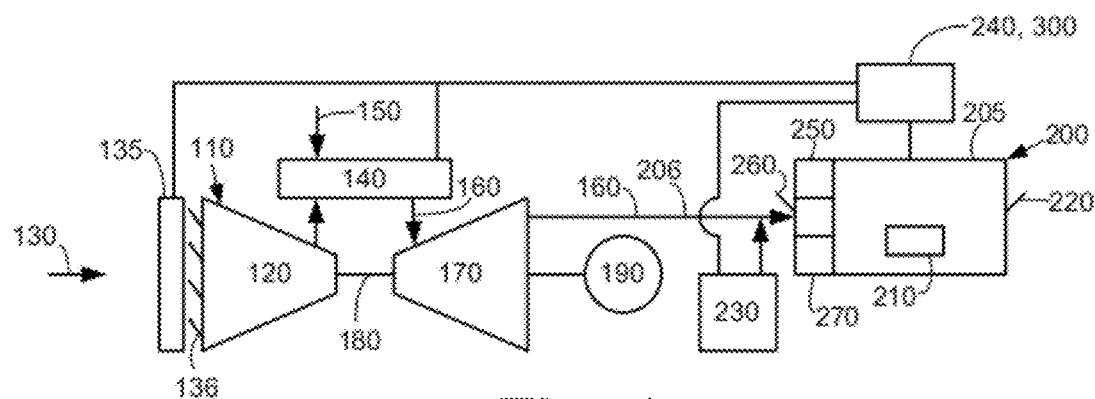
FIG. 1 is a schematic diagram of a gas turbine engine system with a selective catalyst reduction system.

Referring now to the drawings, in which like numerals refer to like elements throughout the several views, FIG. 1 shows a schematic view of a gas turbine engine system 100 as may be described herein. The gas turbine engine system 100 may include a gas turbine engine 110. More than one gas turbine engine 110 may be used herein. The gas turbine engine 110 may include a compressor 120. The compressor 120 compresses an incoming flow of air 130. An incoming air conditioner 135 may be positioned upstream of the compressor 120 so as to condition the incoming flow of air 130 as desired. The incoming air conditioner 135 may heat or cool the incoming flow of air 130 so as to allow the gas turbine exhaust temperatures to be increased or decreased. The compressor 120 also may have a number of inlet guide vanes 136 to control the incoming flow rate so as to allow the gas turbine exhaust temperature to be increased or decreased.

The compressor 120 delivers the compressed flow of air 130 to a combustor 140. The combustor 140 may be a dry low NOx (DLN) design. A fuel system may be used to deliver a compressed flow of fuel 150, where the gas turbine exhaust temperature is increased by a higher flow of fuel. Combinations of fuel flow, inlet guide vanes, and fuel flow can be used to adjust gas turbine exhaust temperature in conjunction with other operating parameters. The combustor 140 mixes the compressed flow of air 130 with the flow of fuel 150 and ignites the mixture to create a flow of combustion gases 160. Although only a single combustor 140 is shown, the gas turbine engine 110 may include any number of combustors 140. The flow of combustion gases 160 is in turn delivered to a turbine 170. The flow of combustion gases 160 drives the turbine 170 so as to produce mechanical work. The mechanical work produced in the turbine 170 drives the compressor 120 via a shaft 180 and an external load 190 such as an electrical generator and the like.

The gas turbine engine 110 may use natural gas, various types of syngas, and/or other types of fuels. The gas turbine engine 110 may be any one of a number of different gas turbine engines offered by General Electric Company (GE) of Schenectady, N.Y., including, but not limited to, those such as a 7 or a 9 Series heavy duty gas turbine engine and the like. The gas turbine engine 110 may have different configurations and may use other types of components. Other types of gas turbine engines also may be used herein. Multiple gas turbine engines, other types of turbines, and other type so power generation equipment also may be used herein together.

The gas turbine engine system 100 also may use a NOx reduction system 200 to reduce NOx emissions. Such a NOx reduction system 200 may include, but is not limited to, a selective catalyst reduction system ("SCR") 205 as may be described herein. Other types of NOx reduction systems 200 that may be used herein include a dry 3-way catalytic NOx reduction system, a NOx reduction system that uses oxidation catalysts and aqueous absorption, a SCONOx system, and the like. The SCR system 205 may be positioned within a heat recovery steam generator (HRSG) or otherwise in communication with the gas turbine engine 110 via diffusion ducting 206. The shape, size, and materials of the diffusion ducting 206 may vary.

The SCR system 205 may include an internal catalyst 210 positioned within a reactor 220. The catalyst 210 may be manufactured from carrier and active catalytic components. The carrier may include various ceramic materials such a titanium oxide and the like. The active catalytic components may include oxides of base metals, vanadium, and tungsten, for example. The active catalytic components also may include zeolites such as iron- and copper-exchanged zeolites. The active catalytic components further may include precious metals such as gold, silver, platinum, and the like. Other types of catalysts and other types of emissions-reducing equipment and systems may be used herein.

The SCR system 205 also may include an injector 230. The injector 230 may inject a reductant that may be absorbed on the surface of the catalyst 210. The reductant may include anhydrous ammonia, aqueous ammonia, urea, and the like. The reductant also may include cyanuric acid and ammonium sulfate. As described above, the combustion gases 160 include nitrogen oxides (NO$_x$). The combustion gases 160 flow into the SCR system 205, react with the reductant absorbed on the surface of the catalyst 210 within the reactor 220, and are converted into nitrogen and water. Other components and other configurations may be used herein.

The gas turbine engine system 100 also may include one or more controllers 240. The controller 240 may be operatively coupled to the gas turbine engine 110, the SCR system 205, and any other components within the overall gas turbine engine system 100. For example, controller 240 may be in communication with the incoming air conditioner 135 upstream of the compressor 120 as well as the combustor 140. Likewise, the controller 240 may be in communication with the injector 230 of the SCR system 205.

The controller 240 may implement various control schemes to regulate the gas turbine engine system 100, such as closed loop control schemes, proportional-integral-derivative (PID) control schemes, open loop control schemes, and/or control schemes that incorporate models for predicting the gas turbine engine system and/or SCR system behavior. The controller 240 may include one or more microprocessors, micro-controllers, digital signal processors, application specific integrated circuits, field programmable gate arrays, discrete logic circuitry, and the like. The controller 240 further may include memory and may store program instructions that cause the controller 240 to provide the functionality described herein. The memory may include one or more volatile, nonvolatile, magnetic, optical, or electrical media, such as read only memory, random access memory, electrically erasable programmable read only memory, flash memory, and the like. Other components and other configurations also may be used herein.

The controller 240 further may include one or more analog to digital converters for processing various analog inputs. The controller 240 may monitor one or more inputs for one or more sensors. For example, a number of SCR inlet sensors 250 may be positioned about an inlet of the SCR system 205. The SCR inlet sensors 250 may include a $NO_2$ sensor 260 and a NO sensor 270. Other types of sensors 250 may be used to measure parameters such as temperature (T), combustion gas mass flow rate (M), and the like.

Figure 2:
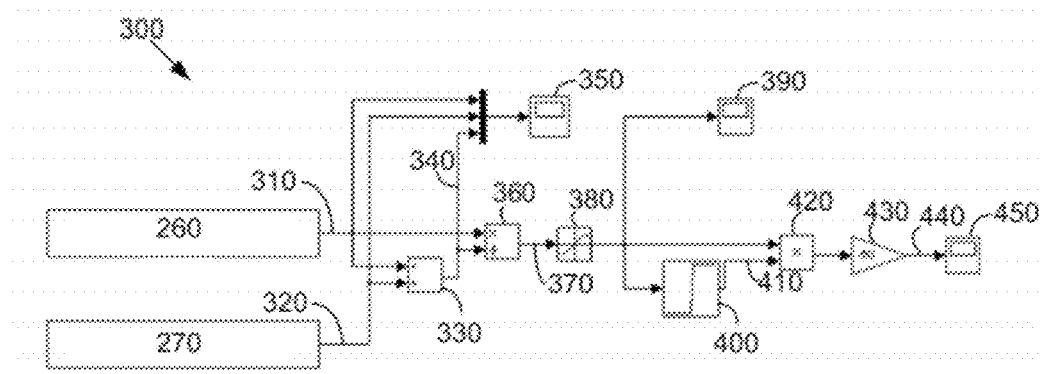
FIG. 2 is a schematic diagram of a NOx emissions controller as may be described herein.

FIG. 2 shows an example of a NO emissions controller 300 as may be described herein. The NO emissions controller 300 may be part of the controller 240 described above or a stand alone unit. FIGS. 3-5 show examples of input and output of the NO emissions controller 300. Other components and other configurations may be used herein.

The $NO_x$ emissions controller 300 may be in communication with the $NO_2$ sensor 260 and the NO sensor 270 upstream of the SCR system 205. One or more output signals also may be in communication with the incoming air conditioner 125, the combustor 140, and other components of the overall gas turbine engine system 100 as will be described in more detail below. Other types of inputs and outputs may be used herein.

In use, the $NO_2$ sensor 260 produces an $NO_2$ signal 310 to the controller 300. Likewise, the NO sensor 270 produces a NO signal 320 to the controller 300. The $NO_2$ signal 310 and the NO signal 320 are added in an adder 330 to produce a total $NO_x$ signal 340. The $NO_2$ signal 310, the NO signal 320, and the total $NO_x$ signal 340 then may be shown on a visual display 350 as is shown in an enlarged view in FIG. 3. The visual display 350 shows the amount of $NO_2$, NO, and total $NO_x$ in the flow of combustion gases 160 in terms of parts per million over time. Other views and other parameters also may be considered herein.

The $NO_2$ signal 310 then may be divided by the $NO_x$ signal 340 in a divider 360 so as to find the ratio of $NO_2$ compared to NO. The divider 360 produces a ratio signal 370. The ratio signal 370 may be subject to a limiter 380 to ensure that the ratio signal 370 is within zero (0) and one (1). Other types of ratios and other types of limits also may be used herein.

The ratio signal 370, as limited by the limiter 380, may be shown on a visual display 390. The visual display shows the ratio of $NO_2$ to NO over time. Other views may be used herein. The ratio signal 370 also may be sent to an emissions lookup table 400. The emissions lookup table 400 may use the ratio signal 370 as an input so as to generate a ratio indication signal 410 with values between zero and one. Specifically, an input of a ratio signal of 0.55 or less results in an output of zero while a ratio signal 370 input of greater than 0.5 will result in an output of one. An input ratio signal between 0.5 and 0.55 will result in a linear interpolation between output values of zero and one. Other types of look up schemes and schedule variants may be used herein.

The ratio signal 370 and the ratio indication signal 410 may be multiplied in a multiplier 420. The product of the multiplier 420 may be sent to an amplifier 430. The gain (−50) of the amplifier 430 may be determined using standard control system design techniques. In this case, the gain may be about −50. Other parameters may be used herein. The output of the amplifier 430 may be an exhaust temperature offset signal 440. The exhaust temperature offset signal 440 may be shown on a visual display 450 as an enlarged view shown in FIG. 5. Other views also may be used herein.

As is shown, the exhaust temperature offset signal 440 may be zero when the ratio of $NO_2$ to total $NO_x$ is less than 0.5. The exhaust temperature offset signal 440 then may increase once the ratio exceeds 0.5. The exhaust temperature offset signal 440 may approach about −50 degrees as the $NO_2$-to NO ratio approaches 1.0. The exhaust temperature offset signal 440 then may decrease towards zero as the ratio falls below 0.5. Other gain values, parameters and other types of control logic may be used herein.

The $NO_x$ emissions controller 300 may be in communication with the incoming air conditioner 135, the compressor 120, the combustor 140, or other components of the gas turbine engine system. The exhaust temperature offset signal 440 of the $NO_x$ emissions controller 300 may instruct the inlet guide vanes 136 to move to more-open or more-closed positions in order to decrease or increase gas turbine exhaust temperature. The inlet air conditioner 135 may be instructed to cool or heat the inlet air in a manner that can decrease or increase gas turbine exhaust temperature. Similarly, the exhaust temperature offset signal may be used to change the nature of the flow of fuel 150 into the combustor 140, a dry low NOx (DLN) combustor operating mode, and the like. The $NO_x$ emissions controller 300 thus may control operational parameters of the gas turbine engine 110 and the SCR system 205 so as to change the temperature of the combustion gases 160 as they leave the turbine 170 and enter the SCR system 205, thereby promoting a favorable $NO_2$-to-NO ratio for increased SCR efficiency. Other components and other configurations may be used herein.

Figure 6:
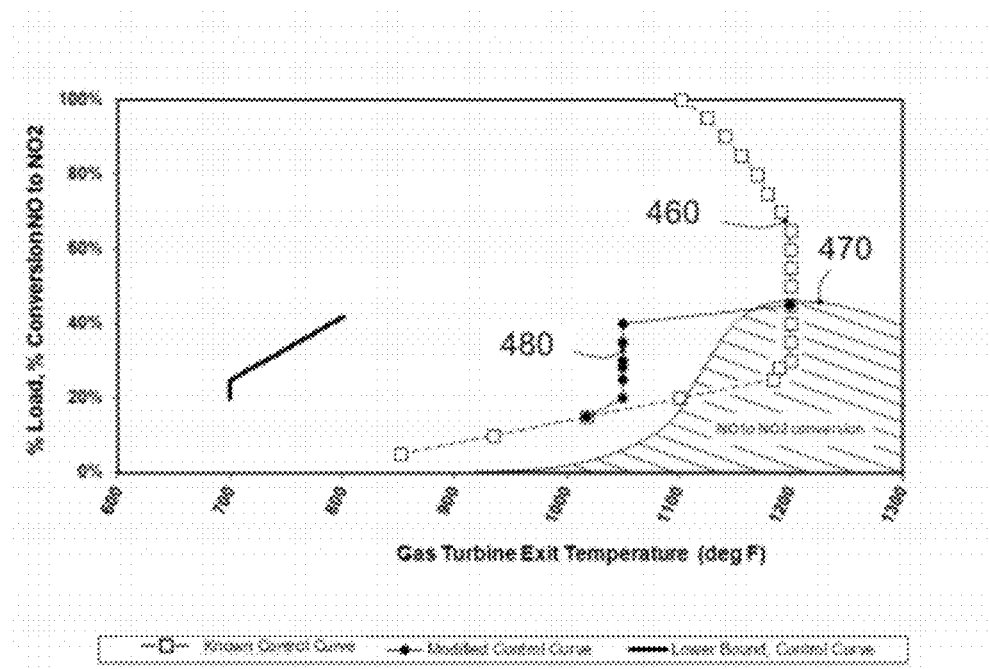
FIG. 6 is a gas turbine operating profile showing exhaust temperature adjustments that can achieve low NO$_2$ emissions at the SCR system inlet.

FIG. 6 shows an operating profile for the gas turbine engine system 100 that includes an existing exhaust gas temperature control curve 460. As shown, the existing control curve operates the gas turbine engine exhaust temperature at about 1200 degrees Fahrenheit (about 649 degrees Celsius) in the range of about 25% to 45% load. This can result in a high percentage of NO-to-$NO_2$ conversion 470 in the exhaust gas stream thereby causing reduced SCR efficiency. A modified control curve 480 may modulate the gas turbine exhaust temperature to about 1050 degrees Fahrenheit (about 565 degrees Celsius) within this range of loads, resulting in a low conversion of NO to $NO_2$ so as to promote increased SCR efficiency. In this example, the inlet guide vanes may be opened by about an additional 5 to 6 degrees to achieve the exhaust gas temperature reduction. An open-loop schedule of $NO_2$-to-NO ratio may be defined as an estimate of $NO_2$ conversion as a function of exhaust gas temperature, wherein the estimate can be determined from testing of similar gas turbine system units, combustion rig tests, and the like. The estimate then may be used to control exhaust gas temperature to achieve the desired $NO_2$-to-NO ratio. The $NO_2$-to-NO ratio also may be determined via direct measurement of $NO_2$ and NO, dividing the values to determine the ratio, then raising or lowering the exhaust gas temperature to achieve the desired $NO_2$-to-NO ratio such as in the example of FIG. 2.

Figure 7:
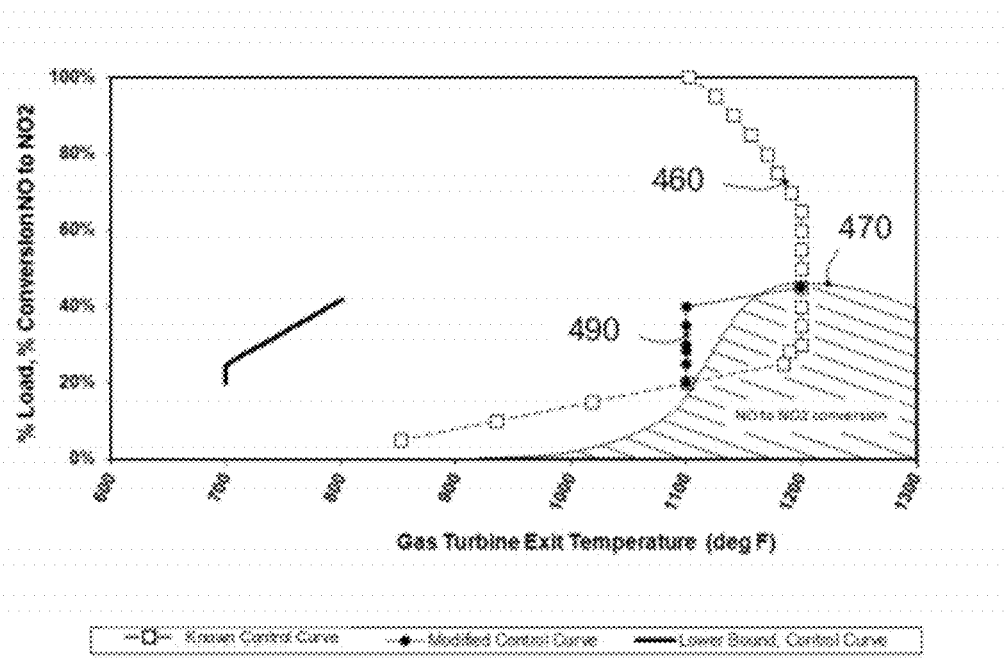
FIG. 7 is a gas turbine operating profile showing temperature adjustments to achieve a NO$_2$:NO ratio of about 1:1 at the SCR system inlet.

Likewise, FIG. 7 shows another example in which the exhaust gas temperature is adjusted as compared to typical operation to achieve about a one to one ratio $NO_2$ to NO at the inlet of the SCR system 205 for high SCR efficiency. In this example, a gas turbine exhaust temperature, as shown in a modified control curve 490, may be adjusted by the $NO_x$ emissions controller 300 from about 25% to about 45%. The exhaust gas temperature may be somewhat higher than in FIG. 6, lying in the range of about 1050 degrees Fahrenheit (about 565 degrees Celsius) to about 1200 degrees Fahrenheit (about 649 degrees Celsius) or higher. The one-to-one ratio may be achieved using an open-loop estimate or direct measurement of $NO_2$ and NO in the same manner as already explained FIG. 6. Other types of operating profiles and other types of controls may be used herein to promote lower levels of emissions.

Figure 8:
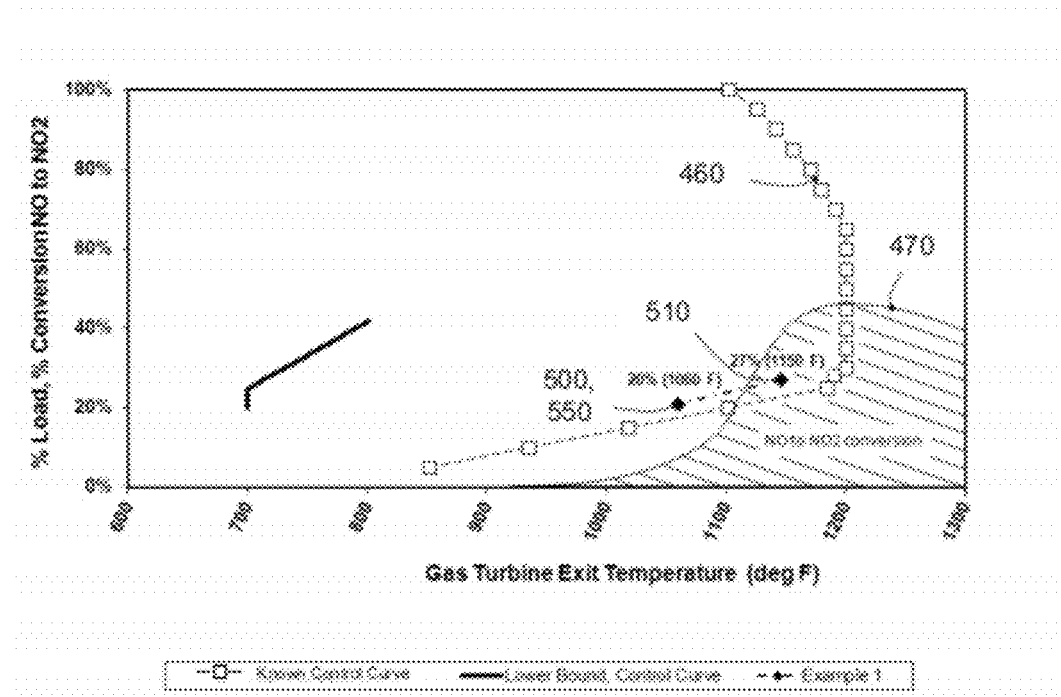
FIG. 8 is a gas turbine operating profile as may be described herein.
Figure 9:
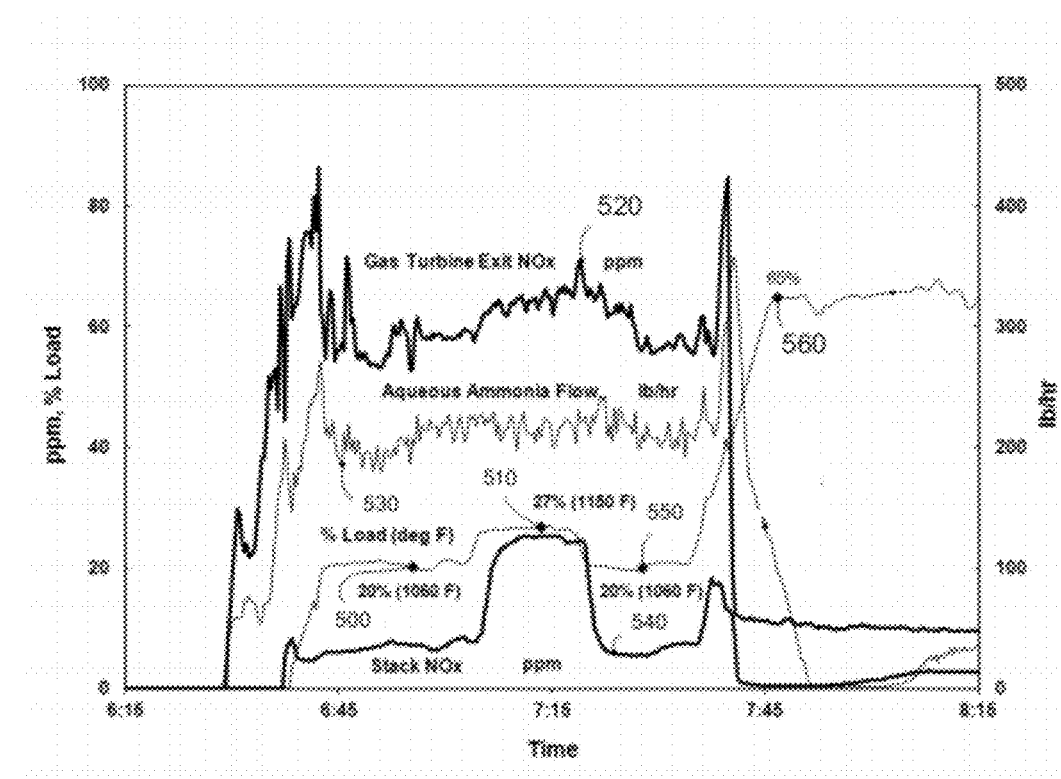
FIG. 9 is a plot of various parameters versus time for the operating profile of FIG. 8.

FIGS. 8 and 9 show an example of operating a heavy duty gas turbine engine 110 within the range of about 20% to 27% load. In these figures, a load of 20% corresponds to numeral 500 whereas a load of 27% corresponds to numeral 510. A combination of fuel flow and inlet guide vanes are used to effect the change in load from 20% to 27% and back to 20% and also to produce associated changes in gas turbine exhaust temperature and NOx (NO, $NO_2$) content. In FIG. 8, the 20% load point corresponds to about a 1060 degree Fahrenheit (about 571 degree Celsius) gas turbine exit temperature and about 5% to 8% conversion of NO to $NO_2$ within the HRSG. The 27% load point corresponds to about an 1150 degree Fahrenheit (about 621 degree Celsius) gas turbine exit temperature and about 40% conversion of NO to $NO_2$.

FIG. 9 illustrates the resulting effect of $NO_2$-to-NO ratio on SCR reduction efficiency. FIG. 9 shows time traces of gas turbine exit NOx 520 in parts per million (ppm—volumetric dry basis), aqueous ammonia flow 530 in pounds per hour, gas turbine load in percent load (% load), and stack NOx 540 in parts per million where stack NOx represents the amount of NOx present at SCR exit. At 20% load 500, the SCR reduces gas turbine exit NOx from about 58 parts per million to about 8 parts per million for a reduction efficiency of about 86%. At 27% load 510, the gas turbine exit NOx increases slightly to about 65 parts per million. However, the SCR only reduces the NOx to about 26 parts per million for a reduction efficiency of about 60%. The reduced SCR efficiency at 27% load is due to a much higher ratio of $NO_2$-to-NO in the combustion gases as compared to 20% load. Following a second period of operation at 20% load (numeral 550), the controls produce a rapid transition from 20% load to about 65% load (numeral 560). This transition causes a short duration of operation in the 27% to 65% range and thus avoids NO to $NO_2$ conversion and poorer SCR efficiency within this load range.

The $NO_x$ emissions controller 300 described herein thus reduces $NO_x$ and $NO_2$ production and also maximizes the efficiency of the SCR system 205. Specifically, the $NO_x$ emissions controller 300 provides closed loop $NO_2$-to-NO ratio control so as to provide the SCR system with an optimum exhaust gas chemical composition for maximum $NO_x$ reduction, thus providing conditions for the "fast" SCR chemical reaction to occur (a "fast" reaction is a simultaneous reduction of NO and $NO_2$). Likewise, the gas turbine exhaust temperature may be adjusted so as to produce the minimum possible $NO_2$ for use with systems only involving control of the SCR system 205. The gas turbine engine system 100 described herein thus provides control of both the gas turbine engine 110 and the SCR system 205 so as to minimize NOx emissions during startup and the like.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

I claim:

1. A gas turbine engine system, comprising:
a gas turbine engine comprising a compressor, a fuel system, a combustor, and a turbine;
a nitrogen oxides reduction system in communication with a flow of combustion gases downstream from the gas turbine engine; and
a nitrogen oxides controller operable to control a ratio of nitrogen dioxide to nitrogen monoxide in the flow of combustion gases entering the nitrogen oxides reduction system;
wherein the nitrogen oxides controller is operable to determine a desired ratio of nitrogen dioxide to nitrogen monoxide in the flow of combustion gases entering the nitrogen oxides reduction system;
wherein the nitrogen oxides controller is in communication with an inlet air conditioner positioned upstream of the compressor, a plurality of inlet guide vanes of the compressor, and/or the fuel system; and
wherein the nitrogen oxides controller is operable to change a temperature of the flow of combustion gases entering the nitrogen oxides reduction system until the desired ratio is met by causing the inlet air conditioner to change a temperature of an incoming flow of air, causing the inlet guide vanes to change a flow rate of the incoming flow of air, and/or causing the fuel system to change a flow rate of a flow of fuel to the combustor.

2. The gas turbine engine system of claim 1, wherein the nitrogen oxides controller is operable to change the temperature of the flow of combustion gases entering the nitrogen oxides reduction system until the desired ratio is met by causing the inlet air conditioner to change the temperature of the incoming flow of air.

3. The gas turbine engine system of claim 1, wherein the nitrogen oxides controller is operable to change the temperature of the flow of combustion gases entering the nitrogen oxides reduction system until the desired ratio is met by causing the inlet guide vanes to change a flow rate of the incoming flow of air.

4. The gas turbine engine system of claim 1, wherein the nitrogen oxides controller is operable to change the temperature of the flow of combustion gases entering the nitrogen oxides reduction system until the desired ratio is met by causing the fuel system to change the flow rate of the flow of fuel to the combustor.

5. The gas turbine engine system of claim 1, further comprising diffusion ducting to direct the flow of combustion gases from the gas turbine engine to the nitrogen oxides reduction system.

6. The gas turbine engine system of claim 1, wherein the nitrogen oxides reduction system comprises a selective catalyst reduction system.

7. The gas turbine engine system of claim 6, wherein the selective catalyst reduction system comprises an injector, and wherein the nitrogen oxides controller is in communication with the injector.

8. The gas turbine engine system of claim 1, wherein the nitrogen oxides controller is operable to produce a ratio signal representing the ratio of nitrogen dioxide to nitrogen monoxide in the flow of combustion gases entering the nitrogen oxides reduction system.

9. The gas turbine engine system of claim 8, wherein the nitrogen oxides controller is operable to produce an exhaust temperature offset signal based in part upon the ratio signal, and wherein the exhaust temperature offset signal causes the inlet air conditioner to change the temperature of the incoming flow of air, the inlet guide vanes to change the flow rate of the incoming flow of air, and/or the fuel system to change the flow rate of the flow of fuel to the combustor, such that the temperature of the flow of combustion gases entering the nitrogen oxides reduction system changes until the desired ratio is met.

10. The gas turbine engine system of claim 9, wherein the exhaust temperature offset signal promotes a reduced amount of nitrogen dioxide in the flow of combustion gases entering the nitrogen oxides reduction system.

11. The gas turbine engine system of claim 9, wherein the exhaust temperature offset signal promotes a one to one ratio of nitrogen dioxide to nitrogen monoxide in the flow of combustion gases entering the nitrogen oxides reduction system.

12. The gas turbine engine system of claim 1, wherein the nitrogen oxides controller comprises an emissions look up table operable to produce a ratio indication signal based upon the ratio signal.

13. A method of reducing emissions in a gas turbine engine system with a nitrogen oxides reduction system, comprising:
- determining an amount of nitrogen dioxide in a flow of combustion gases entering the nitrogen oxides reduction system;
- determining an amount of nitrogen monoxide in the flow of combustion gases entering the nitrogen oxides reduction system;
- determining a ratio of nitrogen dioxide to nitrogen monoxide in the flow of combustion gases entering the nitrogen oxides reduction system;
- determining a desired ratio of nitrogen dioxide to nitrogen monoxide in the flow of combustion gases entering the nitrogen oxides reduction system; and
- changing a temperature of the flow of combustion gases entering the nitrogen oxides reduction system until the desired ratio is met by causing an inlet air conditioner to change a temperature of an incoming flow of air to a compressor, causing a plurality of inlet guide vanes to change a flow rate of the incoming flow of air, and/or causing a fuel system to change a flow rate of a flow of fuel to a combustor.

14. A nitrogen oxides emissions controller system for use with a gas turbine engine and a selective catalyst reduction system, comprising:
- a nitrogen dioxide sensor positioned upstream from the selective catalyst reduction system;
- a nitrogen monoxide sensor positioned upstream from the selective catalyst reduction system;
- a divider operable to produce a ratio signal representing a ratio of nitrogen dioxide to nitrogen monoxide in a flow of combustion gases entering the selective catalyst reduction system;
- an emissions look up table operable to produce a ratio indication signal; and
- a multiplier operable to produce an exhaust temperature offset signal;
- wherein the exhaust temperature offset signal causes an inlet air conditioner to change a temperature of an incoming flow of air to a compressor, a plurality of inlet guide vanes to change a flow rate of the incoming flow of air, and/or a fuel system to change a flow rate of a flow of fuel to a combustor, such that a temperature of the flow of combustion gases entering the selective catalyst reduction system changes until a desired ratio of nitrogen dioxide to nitrogen monoxide in the flow of combustion gases entering the selective catalyst reduction system is met.

15. The nitrogen oxides emissions controller system of claim 14, further comprising an amplifier in communication with the multiplier.

16. The nitrogen oxides emissions controller system of claim 14, further comprising a limiter in communication with the divider.

17. The nitrogen oxides emissions controller system of claim 14, further comprising a nitrogen oxides display.

18. The nitrogen oxides emissions controller system of claim 14, further comprising an exhaust temperature display.

19. The gas turbine engine system of claim 1, wherein the desired ratio of nitrogen dioxide to nitrogen monoxide in the flow of combustion gases entering the nitrogen oxides reduction system is about one to one.

* * * * *